US012570031B2

(12) United States Patent
Lambæk

(10) Patent No.: US 12,570,031 B2
(45) Date of Patent: Mar. 10, 2026

(54) MOLD TOOL FOR INJECTION MOLDING

(71) Applicant: LEGO A/S, Billund (DK)

(72) Inventor: Jens Stamp Lambæk, Billund (DK)

(73) Assignee: LEGO A/S, Billund (DK)

( * ) Notice: Subject to any disclaimer, the term of this patent is extended or adjusted under 35 U.S.C. 154(b) by 152 days.

(21) Appl. No.: 18/246,059

(22) PCT Filed: Sep. 10, 2021

(86) PCT No.: PCT/EP2021/074900
§ 371 (c)(1),
(2) Date: Mar. 21, 2023

(87) PCT Pub. No.: WO2022/063599
PCT Pub. Date: Mar. 31, 2022

(65) Prior Publication Data
US 2024/0316845 A1 Sep. 26, 2024

(30) Foreign Application Priority Data
Sep. 25, 2020 (DK) .............................. PA202070651

(51) Int. Cl.
*B29C 45/26* (2006.01)
*B29C 45/04* (2006.01)
*B29C 45/17* (2006.01)

(52) U.S. Cl.
CPC ...... *B29C 45/2606* (2013.01); *B29C 45/0408* (2013.01); *B29C 45/0441* (2013.01);
(Continued)

(58) Field of Classification Search
CPC ............ B29C 45/2606; B29C 45/0408; B29C 45/0441; B29C 45/1742; B29C 45/2608
See application file for complete search history.

(56) References Cited

U.S. PATENT DOCUMENTS 2,877,070 A * 3/1959 Lee ........................... F16J 15/32
425/DIG. 42
3,782,879 A 1/1974 Mnilk et al.
(Continued)

FOREIGN PATENT DOCUMENTS

CN 106687274 A 5/2017
DE 195 35 080 A1 3/1997
(Continued)

OTHER PUBLICATIONS

JP Office Action corresponding to Application No. 2022-533529, dated Sep. 10, 2024, 5 pages (Machine Translation).
(Continued)

*Primary Examiner* — Galen H Hauth
*Assistant Examiner* — John Robitaille
(74) *Attorney, Agent, or Firm* — Day Pitney LLP; George Chaclas; Anthony A. Kassas

(57) ABSTRACT

An injection-molding tool comprising at least two separate mold parts arranged so that they can be moved along a central tool axis between a closed and an open position. At least one of the mold parts comprises an alignment compensator with a first and a second compensator part. The first compensator part has a socket adapted for receiving the second compensator part so that it can slide along the central tool axis in the socket, and for allowing the second compensator part to tilt in the socket. A seal is arranged so that the seal and the first and the second compensator part encloses a space in the socket containing an elastic or fluid material. The seal also comprises a lid made from a plastic material arranged between the second compensator part and the liquid filled space in the socket.

9 Claims, 1 Drawing Sheet

(52) U.S. Cl.
CPC ...... *B29C 45/1742* (2013.01); *B29C 45/2608*
(2013.01); *B29K 2827/18* (2013.01)

(56) References Cited

U.S. PATENT DOCUMENTS

| | | | |
|---|---|---|---|
| 4,372,740 A | 2/1983 | Kuramochi et al. |
| 4,779,835 A | 10/1988 | Fukushima et al. |
| 5,858,422 A | 1/1999 | Brams |
| 6,077,470 A | 6/2000 | Beaumont |
| 6,250,494 B1 | 6/2001 | Diamond |
| 6,305,266 B1 | 10/2001 | Jensen et al. |
| 6,503,438 B2 | 1/2003 | Beaumont et al. |
| 7,666,335 B2 | 2/2010 | Beaumont |
| 2004/0013762 A1 | 1/2004 | Bianchini |
| 2005/0112309 A1 | 5/2005 | Soerensen |
| 2006/0261521 A1 | 11/2006 | Beaumont |
| 2016/0059296 A1 | 3/2016 | Frost et al. |

FOREIGN PATENT DOCUMENTS

| | | |
|---|---|---|
| JP | 09-11281 A | 1/1997 |
| JP | H1058491 A | 3/1998 |
| JP | 2002070696 A | 3/2002 |
| JP | 2002192561 A | 7/2002 |
| JP | 2010111014 A | 5/2010 |
| JP | 2013193396 A | 9/2013 |

OTHER PUBLICATIONS

DK First Office Action in PA 2020 70651 dated Feb. 25, 2021, 7 pages.
International Search Report with Written Opinion in corresponding International Application No. PCT/EP2021/074900, dated Dec. 23, 2021, 12 pages.
CN Office Action corresponding to Application No. 202180064878. X, dated Mar. 15, 2024, 8 pages (English Translation).
CN Search Report corresponding to Application No. 2021800881981, dated Sep. 26, 2025, 2 pages.

* cited by examiner

MOLD TOOL FOR INJECTION MOLDING

CROSS-REFERENCE TO RELATED APPLICATIONS

This application is a U.S. National Stage of International Application No. PCT/EP2021/074900, filed on Sep. 10, 2021 and published on Mar. 31, 2022 as WO 2022/063599 A1, which claims the benefit and priority of Danish Patent Application No. 202070651, filed on Sep. 25, 2020, the contents of each of the above referenced patent applications is incorporated herein by reference in their entirety for any purpose whatsoever.

BACKGROUND OF THE DISCLOSURE

The present disclosure relates to an injection-molding tool for automated molding of plastic items, said injection-molding tool comprises at least two separate mold parts arranged so that they can be moved along a central tool axis between a closed position where they are abutting each other and an open position where they are away from each other, and where at least one of the mold parts comprises at least one alignment compensator each comprising a first and, at least one, second compensator part the first compensator part having one or more sockets, each socket being adapted for receiving each of the second compensator part so that it can slide along the central tool axis in the socket, and for allowing the second compensator part to tilt in the socket, and where a seal is arranged so that the seal and the first and the second compensator part encloses a space in the socket containing an elastic or fluid like material.

Previous molding tools for the purpose of compensating for misalignment of tool parts may lead to wear and tear of the molds or even to molded products. An example of such a molding tools is U.S. Pat. No. 4,372,740 disclosing a tool for injection molding comprising a mold insert with two or more mold inserts each being arranged in a socket so that a space is enclosed behind each mold insert. Each of the spaces are filled with a fluid substance and one or more flow channels for the fluid substance are provided for allowing the fluid to flow from one space to another and thereby compensating, for example, for inserts having different heights. Furthermore, the inserts are able to tilt in the sockets and thereby enabling angular alignment of the inserts.

It is the object of the present disclosure to provide an injection-molding tool for automated molding of plastic items where alignment of the mold parts is obtained by simple means. This is accomplished by the disclosure, as mentioned in the introduction, and where the seal comprises a lid made from a plastic material and is arranged between a second compensator part and a space in the socket filled with elastic or fluid material. Thereby the seal provides an efficient barrier against leaking of the material in the spaces in the sockets and in disregard of how the second compensator part is tilted with respect to the first compensator part.

According to a preferred embodiment, the seal is formed as a plate with an outer periphery so that it fits snugly or with a press fit into the socket and forms a tight seal along its complete periphery. The seal is preferably made from Polytetrafluorethylene (PTFE).

Each space may preferably be completely enclosed in a socket, but in an alternative embodiment, two or more socket may be connected by at least one channel to allow some fluid or elastic material to pass from one socket to another via the channel.

The elastic or fluid material in the space may be selected from any material that can flow under pressure and provide a substantially hydrostatic pressure in the space in the socket. Examples of such materials may be viscoelastic materials such as silly-putty or materials having a high viscosity such as bitumen. Nevertheless the material may preferably comprise a semi-liquid or semi-solid material that may or may not be hardenable, and in a preferred embodiment, the elastic material is a silicone-based material being highly incompressible.

The injection-molding tool may comprise at least two separate alignment compensators, one of the alignment compensators comprising exactly one first and one second compensator part, and the other one of the alignment compensators comprising two or more second compensator parts arranged in a plane perpendicular to, and in a pattern around, the central tool axis. This embodiments allows the alignment compensators in combination to compensate both for angular misalignments and varying heights of, among others, inserts arranged in the injection molding tool.

In this relation, each of the two or more second compensator parts may preferably constitute mold inserts each having a part of a mold cavity arranged on a side facing away from the socket.

DETAILED DESCRIPTION

Figure 1:
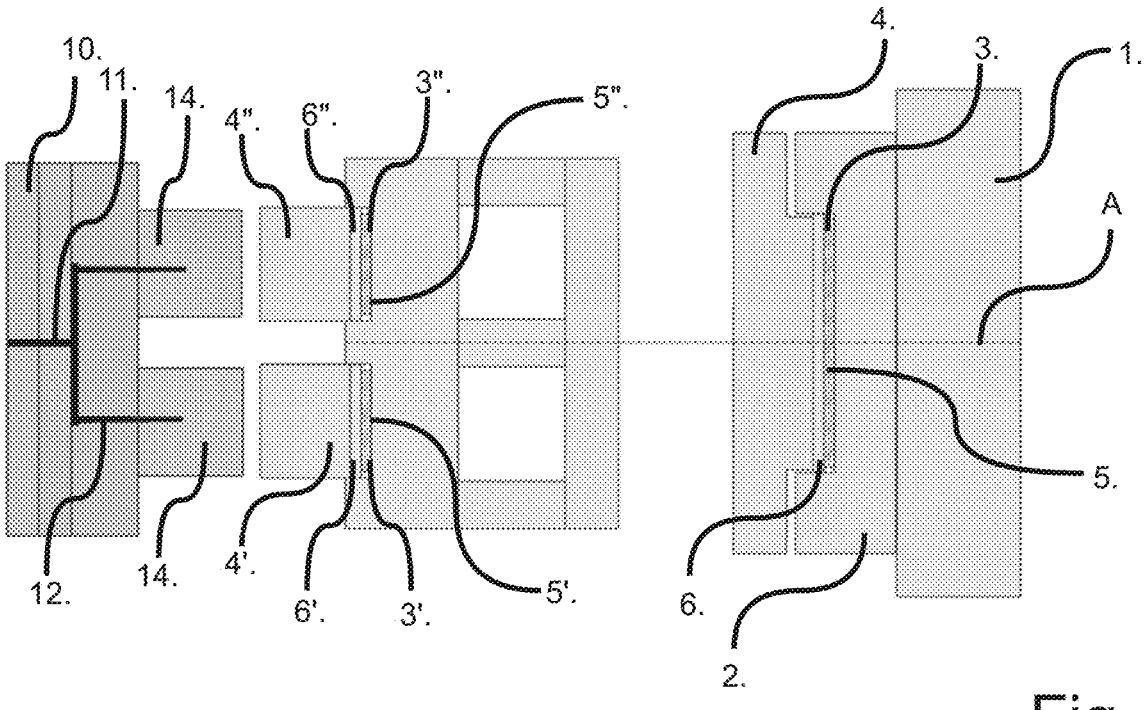
FIG. 1 illustrates a cross-sectional view of an injection-molding tool in a pre-assembled first position according to certain embodiments.
Figure 2:
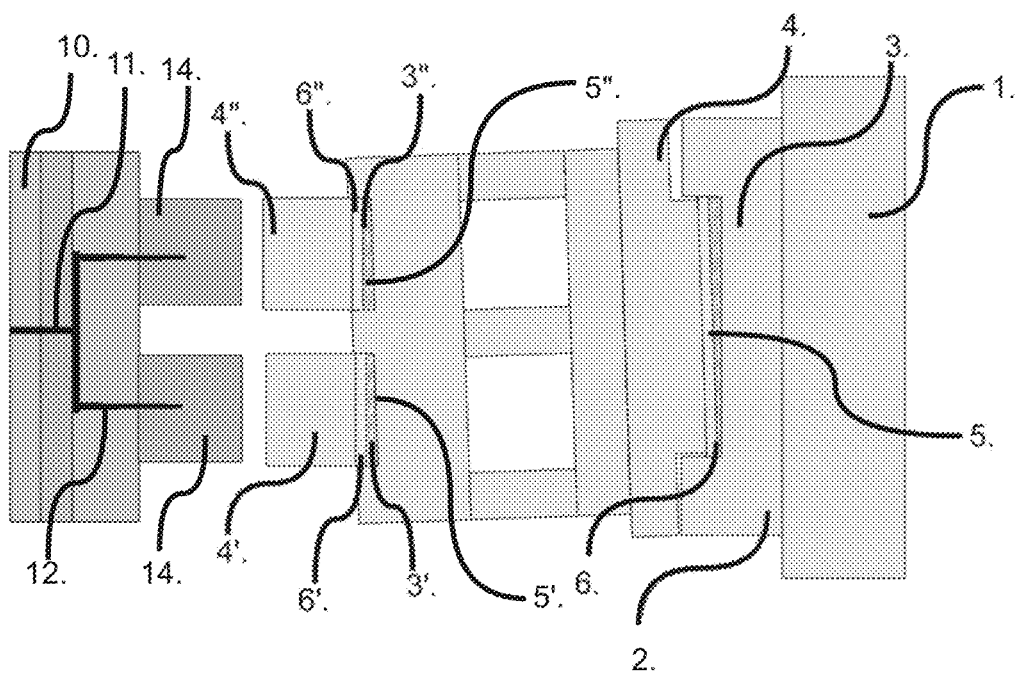
FIG. 2 illustrates a cross-sectional view of an injection-molding tool in a second assembled working position according to certain embodiments.

FIGS. 1 and 2 are principle drawings showing a cross-sectional view of an injection molding tool according to the disclosure in two different positions, which will be explained in more detail below.

Injection molding tools are very complex, and due to the fact that the skilled person would easily be able to recognize that the present disclosure may be applicable to many different embodiments of injection molding tools, the principle drawings only shows the major parts of the injection molding tool. Furthermore, only the details of the injection molding tool necessary in order to illustrate the principle of the present disclosure are shown.

This embodiment of the injection molding tool has a movable baseplate 1 that is adapted (not shown) for being attached to the sliding support structure of an injection molding machine (not shown) that opens and closes the mold. A fixed baseplate 10 is attached to a fixed part of the support structure of the injection molding machine and has a sprue channel 11 and runner channels 12 arranged for receiving molten plastic material from, for example, a plasticizing screw and directing the molten plastic material to a set of mold cavities each being arranged at one mold part 14 that are firmly mounted onto the fixed baseplate 10 on a side facing away from the fixed baseplate 10.

A first alignment compensator is fastened to the movable baseplate 1 that is fixed to a movable part of the injection molding machine (not shown) along a central tool axis A.

The first alignment compensator comprises a first compensator part 2 with a first socket 3 arranged at a side facing away from the moveable baseplate 1. The first socket 3 has an opening in the direction away from the moveable baseplate 1 and a first second compensator part 4 is slidably and tiltably arranged in the open end of the first socket 3. At the closed bottom of the first socket 3 a fluid is enclosed in a first space 5 and a first plate is arranged for separating the first second compensator part 4 from the first fluid filled space 5. The first plate forms a first seal 6 and is fitting snuggly or with a press fit into the sidewalls of the first socket 3 along its complete periphery so that the fluid is completely enclosed in the first space 5.

A second alignment compensator is arranged in a separate part of the injection molding tool. The second alignment compensator comprises one primary compensator part and two second compensators parts, an upper second compensator part 4' and a lower second compensator part 4". The primary compensator part has a second socket 3' and a third socket 3" arranged at the same side of the primary compensator part. The second socket 3' and third socket 3" each have an opening and the respective upper and lower second compensator part 4', 4" is slidably and tiltably arranged in the open end of each of the second and third sockets 3', 3".

At the closed bottom each of the second socket 3' and third socket 3", a fluid is enclosed in a second space 5' and a third space 5" and a plate is arranged for separating each of the upper second compensator part 4' and lower second compensator part 4" from the fluid filled second and third spaces 5', 5". Each of the second and third plates forms second and third seal 6', 6" and is fitting snuggly or with a press fit into the side walls of the second and third sockets 3', 3" along their complete periphery so that the fluid is completely enclosed in the second and third spaces 5'. 5".

The upper second compensator part 4' and lower compensator part 4" in this embodiment both constitute mold parts 14 each having a part of a mold cavity arranged on the side facing away from the second socket 3' and third socket 3" so that they, together with the mold parts 14 mounted on the fixed baseplate 10, forms complete mold cavities.

It will be clear, however, to the skilled person that the upper second compensator part 4' and lower compensator part 4" may constitute other components of the injection mold.

In preferred embodiments, the fluid enclosed in the first, second, and third spaces 5, 5', 5" may be a hardenable or non-hardenable silicon based material having a very low compressibility, and the first, second, and third seals 6, 6', 6" may advantageously be made from a plate of plastic material such as PTFE.

The injection-molding tool thereby comprises a movable part with the movable baseplate 1 being fixed to the movable supporting structure of the injection molding machine (not shown) and the first alignment compensator is fixed onto the movable baseplate 1. A second alignment compensator comprising the mold inserts 14 is in this embodiment an interchangeable unit that can be releasably attached to the first alignment compensator so that it is easy to exchange mold cavities without necessarily dismantling the first alignment compensator from the movable baseplate 1.

FIG. 1 therefore shows the injection-molding tool in a position before assembly, and FIG. 2 shows the same injection molding tool in a fully assembled position after at least one production cycle.

In FIG. 1, all components are symmetrically arranged about the central axis A of the injection molding tool.

When the two separate mold parts are moved together in order to close and open the mold to the position shown in FIG. 2, then the fluids enclosed in the spaces 5, 5', 5" are redistributed due to compression forces applied by the first, upper, and lower, second compensator parts 4, 4', 4". The first, second, and third seals 6, 6', 6" and the first, upper, and lower, second compensator parts 4, 4', 4" are tilted until a hydrostatic pressure is created in the fluid in the first second and third spaces 5, 5', 5", and in this way the first alignment compensator and second alignment compensator can compensate both for angular misalignments and for varying heights of the tool components.

In this open position of the injection molding tool, the mold parts are kept in the aligned position either by friction between the first, second, and third seals 6, 6', 6" fitting snuggly or with a press fit into the respective first, second, and third sockets 3, 3', 3" or the fluid enclosed in the first, second, and third sockets 3, 3', 3" may be a viscoelastic fluid or even be hardened to keep the mutual positions of the components of the injection molding tool.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular embodiments, the present disclosure is not intended to be limited to the particulars disclosed herein; rather, the present disclosure extends to all functionally equivalent structures, methods and uses, such as are within the scope of the claims.

What is claimed is:

1. An injection-molding tool configured for automated molding of plastic items, the injection-molding tool comprising:

at least two separate mold parts positioned along a central tool axis, the at least two separate mold parts in a closed position when the at least two separate mold parts are abutting each other and an open position where the at least two separate mold parts are detached from each other, the at least two separate mold parts each including:

at least one alignment compensator, wherein the compensator comprises a first compensator part;

at least one second compensator part, the first compensator part having one or more sockets, each socket adapted for receiving each of the second compensator part so that it can slide along the central tool axis in the socket, and for allowing the second compensator part to tilt in the socket; and a seal arranged so that the seal and the first and the second compensator part encloses a space in the socket containing an elastic or fluid material, the seal having a lid made from a plastic material and being arranged between the second compensator part and the space in the socket, the seal being a plate having an outer periphery configured to be received by the socket and form a closed seal.

2. An injection-molding tool according to claim 1, wherein the seal is made from Polytetrafluorethylene (PTFE).

3. An injection-molding tool according to claim 1, wherein the space is completely enclosed in the socket.

4. An injection-molding tool according to claim 1, wherein the elastic or fluid material in the space is a semi-liquid or semi-solid material.

5. An injection-molding tool according to claim 1, wherein the elastic material is a viscoelastic material.

6. An injection-molding tool according to claim 1, wherein the elastic material is a silicone material.

7. An injection-molding tool according to claim 1, wherein the injection molding tool comprises at least two separate alignment compensators, one of the alignments compensators comprising exactly one first and one second compensator part, and the other one of the alignment compensators comprising two or more second compensator parts arranged in a plane perpendicular to, and in a pattern around, the central tool axis.

8. An injection-molding tool according to claim 6, wherein each of the two or more second compensator parts are mold inserts each having a part of a mold cavity arranged on a side facing away from the socket.

9. An injection-molding tool comprising:

a moveable baseplate;

a fixed baseplate opposite to the moveable base plate; and an alignment compensator situated between the moveable and fixed baseplates along an axis, the alignment compensator defining:

a compensator plate defining a socket with an elastic material, and a sealing plate configured to sit in the socket of the alignment compensator, wherein when the injection-molding tool is in a closed position, the sealing plate and compensator plate are forced in proximity to each other, and consequentially, the elastic material in the socket is redistributed due to compression forces, forming a fluid seal between the sealing plate and compensator plate, the fluid seal configured for compensating for angular misalignments and varying sized injection-molding tool components.

* * * * *